Feb. 7, 1961 J. L. WATERS ET AL 2,970,512
APPARATUS FOR ANALYSIS OF MATERIALS
Filed March 25, 1957 2 Sheets-Sheet 1
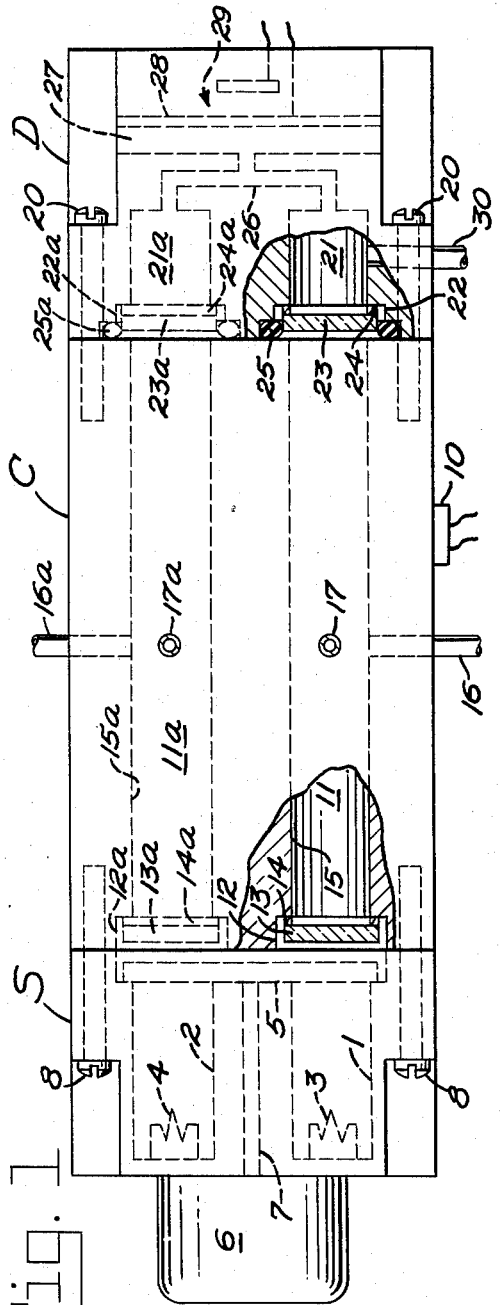
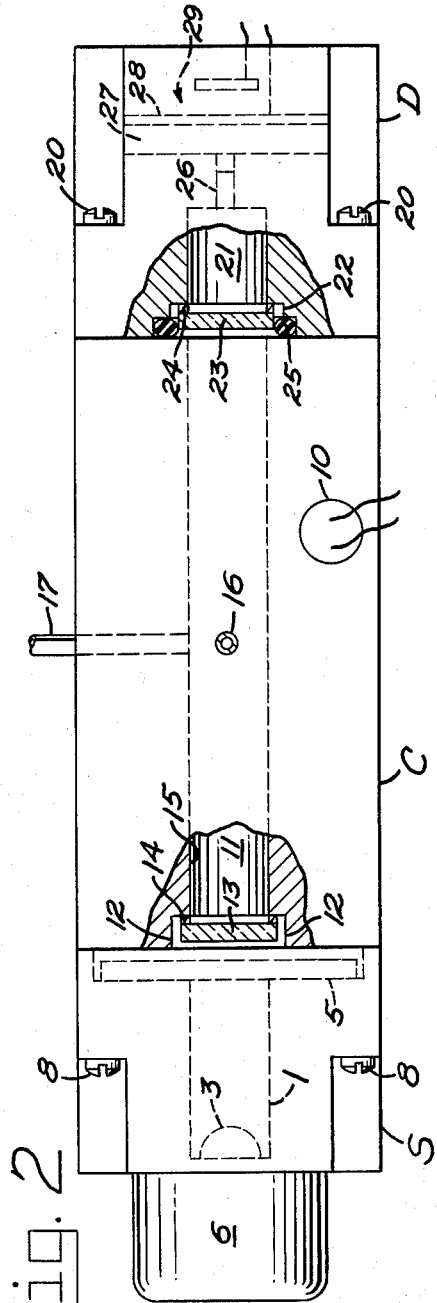
INVENTOR.
JAMES L. WATERS
ARTHUR W. SINKINSON
BY
*Egor G. Shlopak*
ATTORNEY

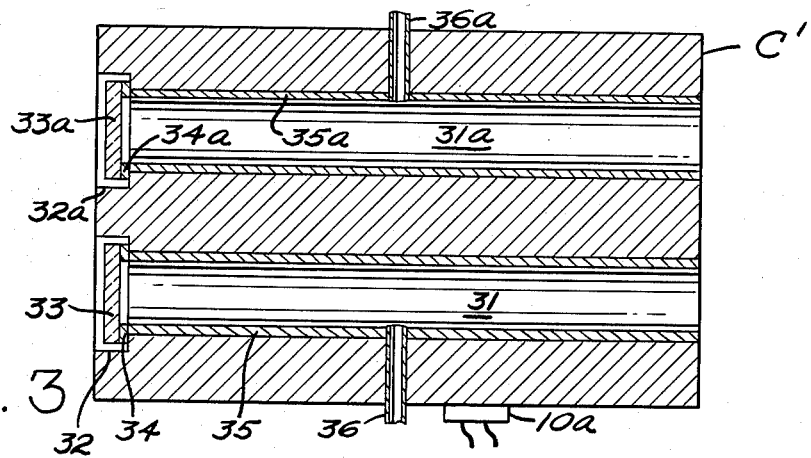
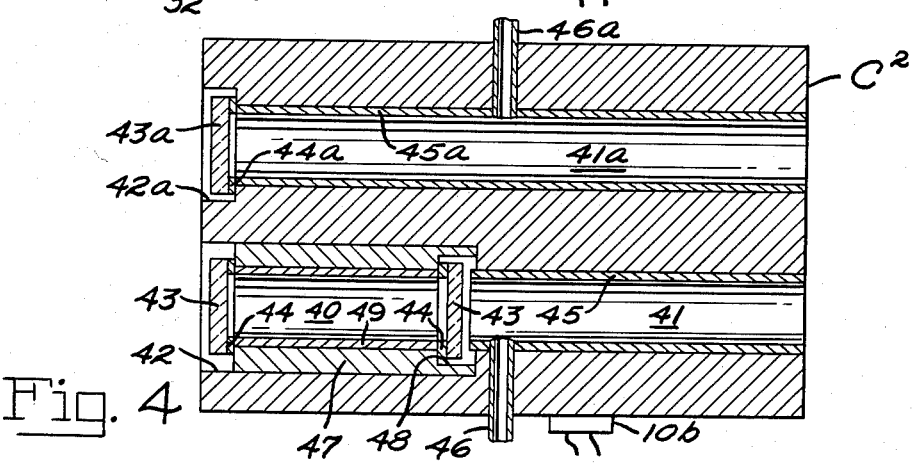
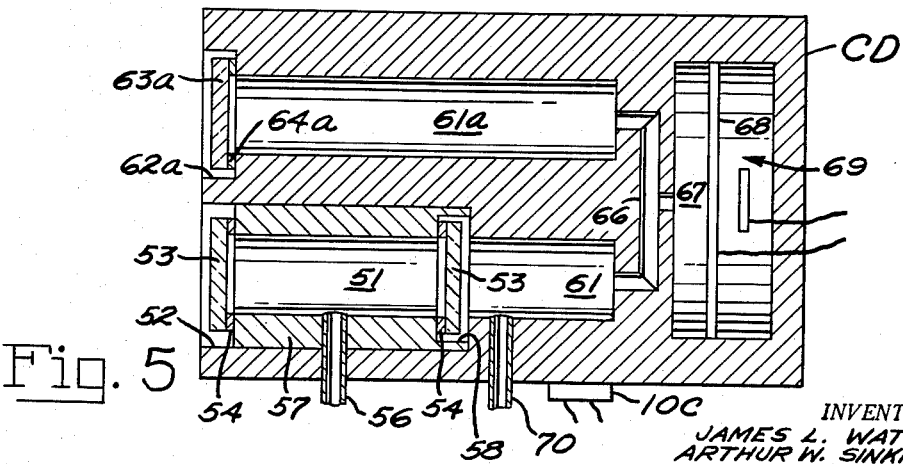

United States Patent Office 2,970,512
Patented Feb. 7, 1961

2,970,512

APPARATUS FOR ANALYSIS OF MATERIALS

James L. Waters, Framingham, and Arthur W. Sinkinson, Holliston, Mass., assignors, by direct and mesne assignments, to Mine Safety Appliances Company, Pittsburgh, Pa., a corporation of Pennsylvania Filed Mar. 25, 1957, Ser. No. 648,044

4 Claims. (Cl. 88—14)

This invention relates to an apparatus for use in the analysis of materials, and more particularly to an improved construction of such apparatus and its component parts.

Apparatus of the type relating to this invention, such as multi-beam optical infrared analyzers are operative for their intended purpose when constructed in a manner to provide a stable transmission of light paths traversing the analyzer. Such stability is dependent upon the rigidity and thermal characteristics of the construction of the analyzer. These specific construction features cannot be provided without giving careful consideration to fabrication procedures and costs, material costs, and weight and space requirements.

Present construction practices involve the assembly of many components easily susceptible to instability of light transmission resulting from the inability to withstand vibrations present within and around the analyzer, and the inability to prevent creep or slow relative motion between components due to thermal changes or stress relief. Where some measure of success has been obtained in providing desired rigidity for many components, disadvantageous thermal inefficiency, increased number of supporting and fastening components, increased fabrication problems, increased weight and bulkiness, and increased fabrication and material costs have resulted to prevent solving the analyzer stability problem. Consequently, present day analyzer constructions have not proven satisfactory even for limited periods of analyzer operation.

Accordingly, it is among the objects of this invention to provide a multi-beam optical apparatus having components of a construction which have the capacity to withstand effects of vibrations and thermal changes to which apparatus of this type may reasonably be subjected. A further object is to provide a device having few components that are readily fabricated and assembled, and which is light in weight, small in size, and comparatively inexpensive to produce. Another object is to provide a device which retains its operational efficiency and accuracy for a long period of use. Another object is to provide a multi-beam optical apparatus having stable light transmitting paths.

Other objects and advantages will become apparent from the following description and annexed drawings in which:

Fig. 1 is a top plan view, partly in section, of an infrared gas analyzer;

Fig. 2 is a side elevation, partly in section, of the device shown in Fig. 1;

Fig. 3 is a horizontal sectional view of another form of cell block unit shown in Figs. 1 and 2;

Fig. 4 is a horizontal sectional view of still another form of cell block unit; and Fig. 5 is a horizontal sectional view of a combined cell block and detector block unit.

It is particularly pointed out that the instant invention is illustrated in Figs. 1–4 only. The invention illustrated in Fig. 5 and described hereinbelow is the sole invention of James L. Waters, co-inventor herein, and claimed in a separate co-pending application Serial No. 648,045 filed March 25, 1957.

This invention is applicable to, and is herein illustrated as embodied in, gas analysis apparatus wherein infrared radiation is caused to travel along two paths and is caused to traverse the cell containing the gas to be analyzed in one of said paths, and wherein the gas in said analysis cell affects the relative intensity of the beams. The gas is ordinarily continuously passed through said analysis cell. An advantageous mode of analysis of this type is described in co-pending application Serial No. 403,525 filed January 12, 1954, and entitled "Gas Analysis Apparatus." This application has matured as Patent No. 2,802,109 issued August 6, 1957.

Referring to Figs. 1 and 2, the apparatus is shown as comprising three single block units S, C and D, each of which is generally rectangular and made of, for example, aluminum which has high heat conductivity and can be maintained at a uniform elevated temperature. Source unit S provides a housing or block comprising passages 1 and 2 having arranged therein infrared sources 3 and 4, the beams from which, may be interrupted or alternated by the interrupter member 5 rotatably actuated by motor 6 through motor shaft 7.

Cell unit C is connected to unit S in abutting relationship by suitable mechanical fastening means, such as bolts 8 in a manner whereby the end surfaces of units S and C are in thermal contact with each other. Unit C is apertured to receive an electrical heating unit 10 providing means for elevating the apparatus to a uniform elevated temperature. Unit C provides a housing or block forming an analysis or sample gas chamber or passage 11 and a comparison gas chamber or passage 11a aligned with passages 1 and 2 of unit S. Chamber 11 extends throughout the length of unit C and is sealed at one end by a window 13 of infrared transmitting material, such as calcium fluoride. Recess or passage 12 is provided in the end of unit C for containing window 13 and a lead washer 14. Washer 14 is inserted between the end of chamber 11 and window 13 to safeguard the latter from expansion and contraction of metallic components due to thermal variations. Window 13 is slightly spaced from the end of unit C and the wall of recess 12 for this same purpose. Preferably, washer 14 is connected to the end of chamber 11 by cement, and window 13 is connected to washer 14, similarly, by cement. The peripheral space between the wall of recess 12 and window 13 and washer 14 conveniently forms a trap for excess cement. Wall 15 of chamber 11 is highly polished to limit absorption of infrared radiation through the walls of unit C. A convenient means for passing analysis gas through chamber 11 is provided, such as through conduits 16 and 17. Recess 12a, window 13a, lead washer 14a, wall 15a, and conduits 16a and 17a are identical in construction and function as the counterpart components just described. Conduits 16a and 17a, however, are preferably sealed after reference gas chamber 11a is filled.

Detector unit D is secured to unit C in abutting relationship for thermal contact therewith by fastening means, such as bolts 20, and provides a housing or block forming gas chambers or passages 21 and 21a. These chambers 21 and 21a are aligned with chambers 11 and 11a, and are connected together, at the rear thereof, by conduit means 26 leading into a chamber 27 closed by a flexible membrane or diaphragm 28. Chambers 21 and 21a are sealed at the ends aligned with chambers 11 and 11a by a window construction substantially identical to that described for chambers 11 and 11a. Recesses or passages 22 and 22a, however, are enlarged to accommodate O rings 25 and 25a to provide a gas seal between units C and D to prevent gas from escaping from chambers 11 and 11a. Thus, with the exception of the enlargement of recesses 22 and 22a, just mentioned, windows 23 and 23a, lead washers 24 and 24a are constructed and arranged to seal chambers 21 and 21a in the same manner as described above for chambers 11 and 11a. Chambers 21 and 21a contain a detector gas to which diaphragm 28 is responsive. Condenser microphone 29 receives signals emanating from the vibrations of diaphragm 28, and such signals may be amplified and further recorded, if desired. Chambers 21, 21a, and 27 may be filled with detector gas through conduit 30, which in turn, is subsequently sealed.

For the operation of the known infrared analyzer, such as here described and illustrated, reference may be had to Patent No. 2,648,775, and/or co-pending application Serial No. 403,525 mentioned above. Briefly stated, the analyzer of this invention passes beams from infrared sources 3 and 4, alternately, through analysis or sample gas chamber 11 and comparison or reference gas chamber 11a into chambers 21, 21a and 27 containing a detector gas. The absorption of infrared radiation by the analysis gas is reflected in the detector gas chambers to vibrate diaphragm 28 and produce a signal which is picked up by microphone 29. Thus, the composition of the gas being analyzed can be determined.

The primary advantages of the analyzer construction hereinabove described should now be obvious. Since the analyzer comprises only three units with few connectors, stability of light transmission can be easily provided throughout the length of the analyzer regardless of how great vibrations may be within and around the analyzer. Further, since only a few components are employed and these are readily connected in excellent thermal contact with each other, it is possible to maintain equal temperature conditions throughout the entire analyzer to prevent unequal absorption of infrared radiation through the walls of the device. This unequal absorption, of course, would result in unequal radiation through the analysis and reference gas chambers. Moreover, the unitized construction permits using only a single window between aligned passages which results in increased and equal light transmission through the chambers, and results in decreased costs. Also, simple fastening means securing each of the units together can be employed to provide a rigid structure whose components are easily attached in immovable true alignment. Making the cell unit as a single housing or block further provides equal stability for the analysis and reference gas chambers.

Reference is now made to Fig. 3 wherein is shown another form of cell unit $C^1$ which may be substituted for unit C shown in Figs. 1 and 2. The only material difference between units C and $C^1$ is that the latter comprises tubular, stainless steel, liners 35 and 35a forming an analysis or a sample gas chamber 31 and a comparison or reference gas chamber 31a, respectively. The inner walls of liners 35 and 35a are gold coated and highly polished to increase the reflectivity of the liners to thereby decrease the absorption of the infrared radiation passing through the liners. The remaining structure of unit $C^1$, that is, heater 10a, recesses or passages 32 and 32a, windows 33 and 33a, lead washers 34 and 34a and conduits 36 and 36a, is identical in construction and function to the counterpart structure shown in Figs. 1 and 2. Thus, unit $C^1$ is fully interchangeable with unit C, and is connected to units S and D in precisely the same manenr as is shown in Figs. 1 and 2 for unit C. As mentioned, the advantage of such substitution is to utilize a cell block unit having a minimum amount of infrared radiation absorption through the walls of the unit to provide a more equal and accurate light path.

Referring to Fig. 4, a still further form of the cell unit is shown and designated as $C^2$. Cell unit $C^2$ is likewise interchangeable with either units C or $C^1$, and is assembled with units S and D as described above.

Unit $C^2$ provides a housing or block forming an analysis gas chamber or passage 41 and a reference gas chamber or passage 41a extending from recess or passage 42a. These chambers are formed by tubular, stainless steel, gold coated, liners 45 and 45a identical to liners 35 and 35a of Fig. 3, with the exception, that liner 45 is shorter in length than liner 35. Unit $C^2$ comprises a recess or passage 42 for the reception of an aluminum, tubular, insert 47 containing a tubular, stainless steel, gold coated, liner 49 extending therethrough forming a gas filter chamber 40. Insert 47 is recessed at 48, and chamber 40 is sealed at both ends by a window and washer assembly comprising windows 43, 43 and lead washers 44, 44. Windows 43, 43 and 43a and lead washers 44, 44 and 44a are constructed identically to the counterpart construction fully described above. Chamber 40 is adapted to contain a gas which will function as a filter for filtering out desired bands of light in the infrared spectrum. Conduits 46 and 46a, and heater 10b have been provided for the purpose hereinbefore described. For those applications of the analyzer where it is desirable that the infrared radiation be filtered ahead of the analysis gas, cell unit $C^2$ can be substituted for either units C or $C^1$. In addition, all the advantages of using high reflective liners are obtained. Some conventional means, not shown, of filling chamber 40 with filter gas is provided; such as, conveying the gas through an aperture in liner 49 through the wall of unit $C^2$ after the ends of liner 49 have been sealed by the window and washer assembly, and then, sealing the aperture. Alternatively, conduit pipe means might be employed for this purpose.

It should be readily understood, when referring to Figs. 1–4, that recesses 22, 22a, window assemblies 23, 24, 23a, 24a, and O rings 25, 25a, (Fig. 1) could be bodily reversed and disposed within the ends of cell units C, $C^1$ and $C^2$ for sealing the open ends of the analysis and reference gas chambers of each cell unit. Such modification requires only that the chambers be spaced from the ends of the units in the same manner as is shown for the opposite sealed ends of the cell units. Moreover, only one chamber in the cell unit may be so sealed by such reversal of parts while retaining the illustrated construction for the other chamber.

Referring now to Fig. 5, a combination cell unit and detector unit, hereinafter referred to as an analysis unit, is shown and designated as CD. This analysis unit CD is employed when analysis of a simple gas is desired. Unit CD is substituted for units C and D of Figs. 1 and 2, and is connected directly to source unit S by bolts B. Unit CD provides a housing or block forming detector gas chambers or passages 61 and 61a communicating with each other at the rear by conduit means 66 leading into a gas chamber 67 closed by a flexible membrane or diaphragm 68. Condenser microphone 69 receives the signals caused by the vibrations of diaphragm 68; such signals being amplified and recorded, if desired. These components are similar to those shown in unit D of Figs. 1 and 2. Chamber 61 is sealed by tubular insert 57 forming an analysis gas chamber 51, and chamber 61a is sealed by lead washer 64a and window 63a contained in recess or passage 62a. Insert 57 is similar to insert 47 of Fig. 4, but does not include a liner and comprises, in addition, a conduit 56 for passing analysis gas through chamber 51. Recess or passage 52, windows 53, 53, lead washers 54, 54 and recess 58 are identical to the counterpart components shown in Fig. 4. Also, recess 62a, window 63a, lead washer 64a and heater 10c are of the same construction and function as the counterpart components disclosed in Figs. 1–4. In Fig. 5, chamber 61a functions as a comparison or reference gas chamber in addition to its function as a detector gas chamber. That is, the analysis gas is compared with the detector gas for detecting gas constituents. These chambers may be filled with a detector gas through conduit 70, for example, after chambers 61 and 61a are sealed; after which, conduit 70 is sealed.

Having explained the principle of the present invention and having illustrated and described what is considered to be several of the best embodiments, it is to be understood that, within the scope of the appended claims, the invention may be practiced otherwise than as specifically illustrated and described.

We claim:

1. A multi-beam optical analyzer for the analysis of materials comprising a single metal block light source unit having passage means for directing light beams, a single metal block cell unit having at least two chambers extending therethrough, said chambers being along side of each other and optically aligned with said passage means, at least one of said chambers adapted to contain an analysis material and at least another of said chambers adapted to contain a reference material, a single metal block detector unit having detector means optically aligned with said chambers, said cell unit constituting the only unit between said source and detector units, and said units having parallel end surfaces rigidly connected in abutting relationship with each other to thereby provide thermal conduction and stable light transmission through the analyzer.

2. The combination of claim 1 and, recesses formed in the end of said cell unit that abuts said source unit and disposed between the ends of said chambers and said end of said cell unit, and light transmitting means disposed in each of said recesses and sealing the ends of said chambers.

3. A multi-beam optical analyzer for the analysis of materials comprising a single metal block light source unit having passage means for directing light beams, a single metal block cell unit having at least two chambers extending therethrough, said chambers being along side of each other and optically aligned with said passage means and at least one of said chambers adapted to contain an analysis material and at least another of said chambers adapted to contain a reference material, a single metal block detector unit having detector means optically aligned with said chambers, said cell unit constituting the only unit between said source and detector units, said units having parallel end surfaces rigidly connected in abutting relationship with each other to thereby provide thermal conduction and stable light transmission through the analyzer, recesses formed in the end of said cell unit that abuts said source unit, said recesses disposed between the ends of said chambers and said end of said cell unit, first light transmitting means disposed in each of said recesses and sealing the ends of said chambers, and sealing means including second light transmitting means disposed between opposite ends of said chambers and said detector means for sealing said opposite ends and detector means from the surrounding atmosphere.

4. A multi-beam optical analyzer for the analysis of materials comprising a single metal block light source unit having passage means for directing light beams, a single metal block cell unit having at least two chambers along side of each other and optically aligned with said passage means, a single metal block detector unit optically aligned with said chambers, said units having parallel end surfaces rigidly connected in abutting relationship with each other to thereby provide thermal conduction and stable light transmission through the analyzer, at least one of said chambers adapted to contain an analysis material and at least another of said chambers adapted to contain a reference material, walls forming a passage between each of said chambers and one end of said cell housing; light transmitting means disposed in each passage and sealing the end of each chamber, and the means sealing said at least one of said chambers comprising a tubular insert forming a filter chamber and comprising windows sealing each end of said insert.

References Cited in the file of this patent

UNITED STATES PATENTS

| | | |
|---|---|---|
| 1,914,937 | Bodine | June 20, 1933 |
| 2,649,011 | Black | Aug. 18, 1953 |
| 2,681,415 | Liston | June 15, 1954 |
| 2,690,695 | Coates | Oct. 5, 1954 |
| 2,700,320 | Malmros | Jan. 25, 1955 |
| 2,802,109 | Waters | Aug. 6, 1957 |
| 2,824,968 | Sparks et al. | Feb. 25, 1958 |
| 2,844,729 | Winterling et al. | July 22, 1958 |